United States Patent
Byers

(10) Patent No.: US 9,976,855 B1
(45) Date of Patent: *May 22, 2018

(54) COLUMN INSTALLATION KIT

(71) Applicant: HB&G Building Products, Inc., Troy, AL (US)

(72) Inventor: Jeffrey Owen Byers, Pike Road, AL (US)

(73) Assignee: HB&G Building Products, Inc., Troy, AL (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/604,897

(22) Filed: May 25, 2017

Related U.S. Application Data

(63) Continuation-in-part of application No. 14/732,932, filed on Jun. 8, 2015, now Pat. No. 9,689,674.

(60) Provisional application No. 62/016,274, filed on Jun. 24, 2014.

(51) Int. Cl.
  *G01C 15/10* (2006.01)
  *G01C 9/14* (2006.01)

(52) U.S. Cl.
  CPC .............. *G01C 15/10* (2013.01); *G01C 9/14* (2013.01)

(58) Field of Classification Search
  CPC ................... G01C 15/10; G01C 9/14
  USPC ......... 33/392, 374, 333, 347, 354, 365, 370, 33/391; 52/300, 301, 745.17
  See application file for complete search history.

(56) References Cited

U.S. PATENT DOCUMENTS

| | | | |
|---|---|---|---|
| 1,874,057 A | 8/1932 | Murphy | |
| 2,545,321 A | 3/1951 | Tumminello | |
| 3,589,014 A | 6/1971 | Horace | |
| 3,874,088 A | 4/1975 | Shaffer, Jr. | |
| 5,605,023 A * | 2/1997 | Biernazki | E04C 3/30 52/301 |
| 5,950,318 A | 9/1999 | Montes | |
| 6,021,578 A | 2/2000 | DeVingo | |
| 6,453,574 B1 | 9/2002 | Chen | |
| 7,036,235 B1 | 5/2006 | Cohen | |
| 7,055,256 B2 | 6/2006 | Alecci | |
| 8,424,259 B2 | 4/2013 | Koren | |
| 8,595,947 B2 | 12/2013 | Cade | |
| 8,713,873 B2 | 5/2014 | Koren | |
| 9,470,001 B2 | 10/2016 | Koren | |
| 9,689,674 B1 * | 6/2017 | Byers | G01C 15/10 |
| 2008/0184641 A1 * | 8/2008 | Hendricks | E04C 3/30 52/301 |

* cited by examiner

*Primary Examiner* — Christopher Fulton
(74) *Attorney, Agent, or Firm* — Suiter Swantz pc llo

(57) ABSTRACT

A top mounted column placement element includes a plumb bob hanging element to allow a plumb bob to hang from the top mounted column placement element and identify a corresponding portion of a bottom mounted column placement element. The top mounted column placement element defines a column perimeter. The bottom mounted column placement element also defines a column perimeter. Once the top mounted column placement portion and bottom mounted column placement element are in place, the column can be placed and set to conform to both defined column perimeters, ensuring the column is properly positioned.

14 Claims, 11 Drawing Sheets

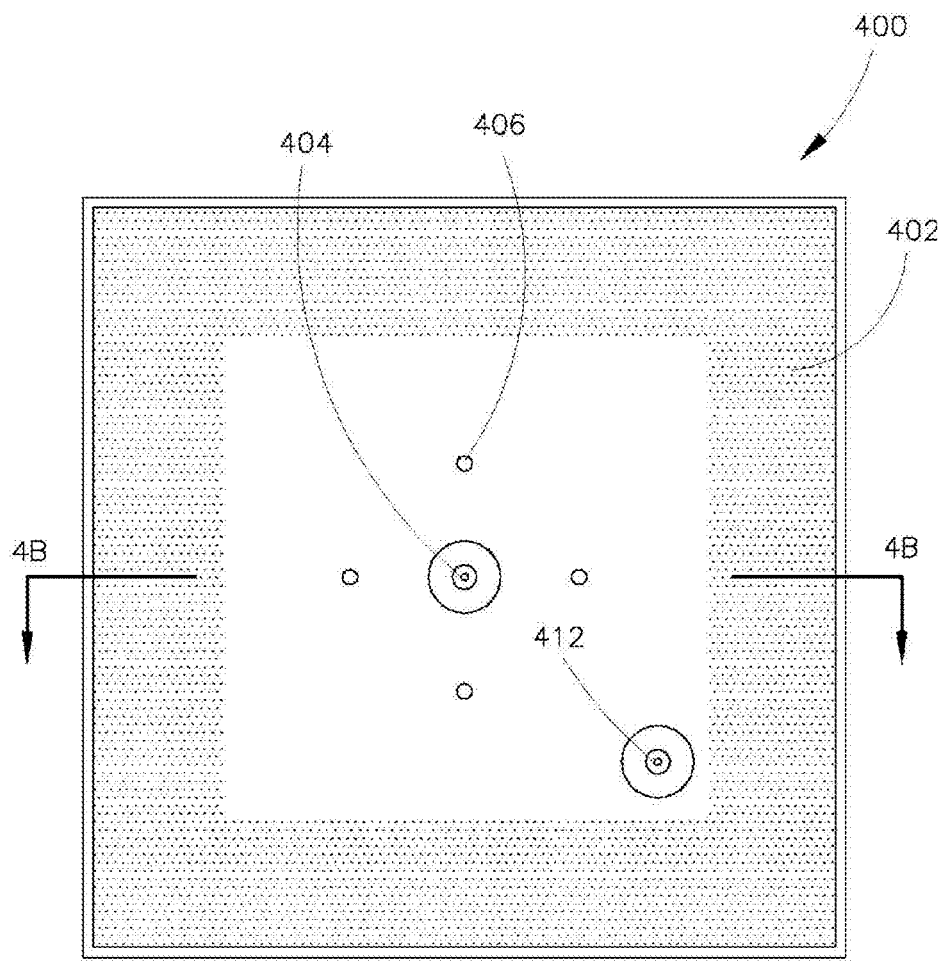
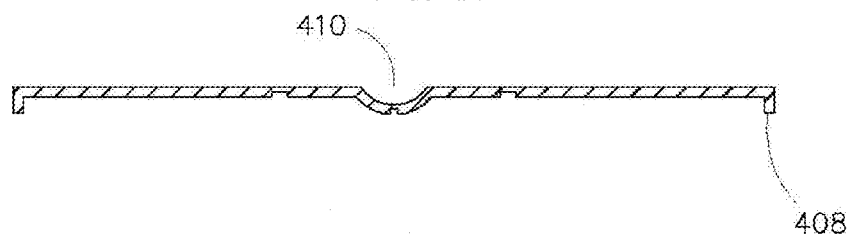
FIG. 4A
FIG. 4B

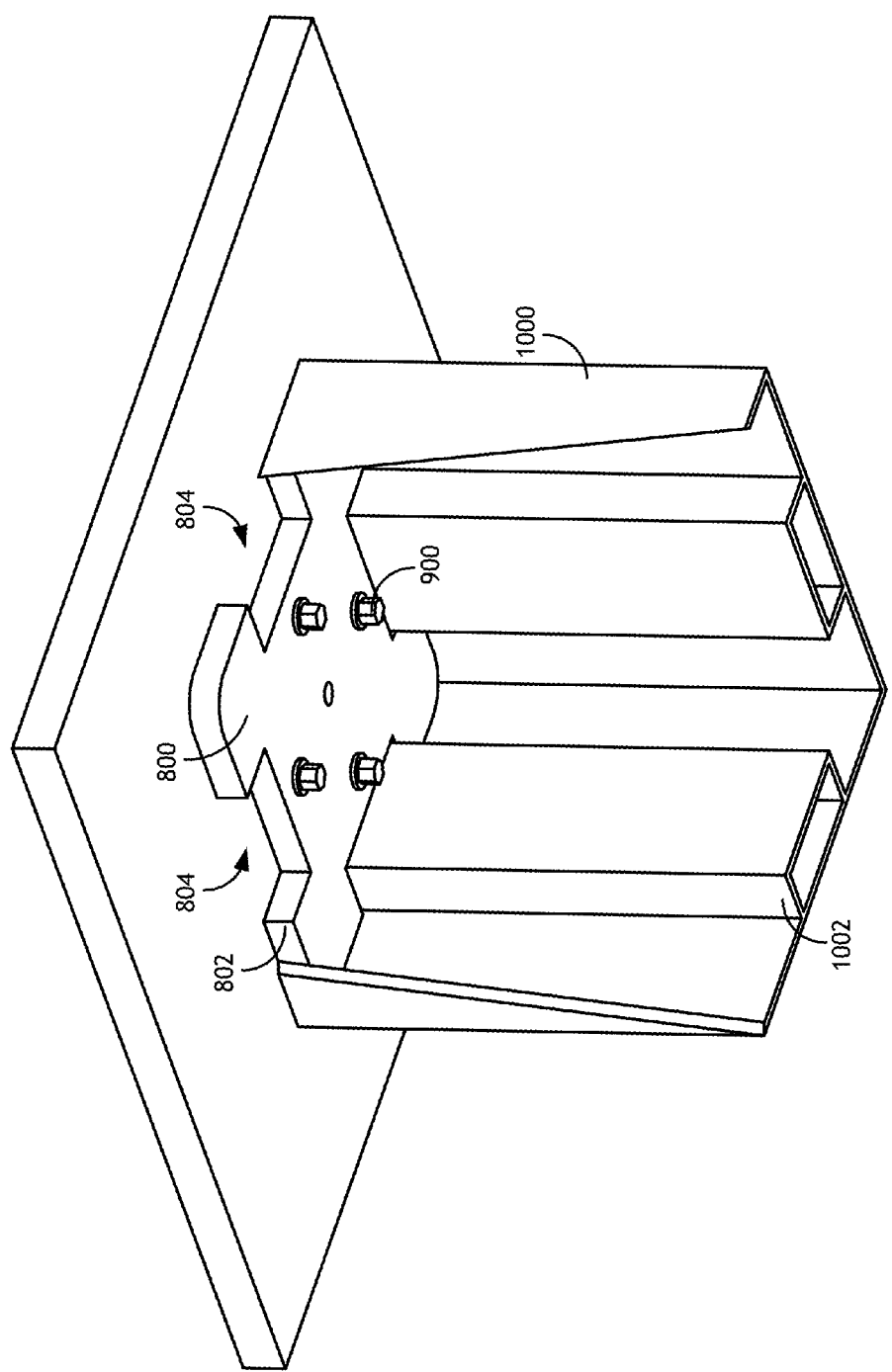

US 9,976,855 B1

COLUMN INSTALLATION KIT

PRIORITY

The present application claims the benefit under 35 U.S.C. § 120 of U.S. patent application Ser. No. 14/732,932 (filed Jun. 8, 2015) which claims the benefit under 35 U.S.C. § 119(e) of U.S. Provisional App. No. 62/016,274 (filed Jun. 24, 2014), which are incorporated herein by reference.

FIELD OF THE INVENTION

The present invention is directed generally toward building devices and more particularly toward installation accessories for columns.

BACKGROUND OF THE INVENTION

Installing a column properly is a laborious, time consuming task. Columns are often shaped such that they do not have flat exterior surfaces suitable as a reference surface for plumbing the column. Furthermore, when the column is placed on a ground surface that is even slightly non-level, setting the column is a matter of trial and error with no reliable means for objectively testing for plumb.

Consequently, it would be advantageous if an apparatus existed that is suitable for objectively determining a proper location for the top and bottom of a column before the column is installed.

SUMMARY OF THE INVENTION

Accordingly, the present invention is directed to a novel method and apparatus for objectively determining a proper location for the top and bottom of a column before the column is installed.

In one embodiment of the present invention, a top mounted column placement element includes a plumb bob hanging element to allow a plumb bob to hang from the top mounted column placement element and identify a corresponding portion of a bottom mounted column placement element. The top mounted column placement element defines a column perimeter. The bottom mounted column placement element also defines a column perimeter. Once the top mounted column placement portion and bottom mounted column placement element are in place, the column can be placed and set to conform to both defined column perimeters, ensuring the column is properly positioned.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which:

FIG. 4A shows a top, schematic view of a top mounted column placement element for a square column according to one embodiment of the present invention;

FIG. 4B shows a side, schematic view of a top mounted column placement element for a square column according to one embodiment of the present invention;

FIG. 10A shows a perspective, environmental, partial cross-sectional view of the top mounted column placement element of FIG. 8 with a corresponding column;

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1A:
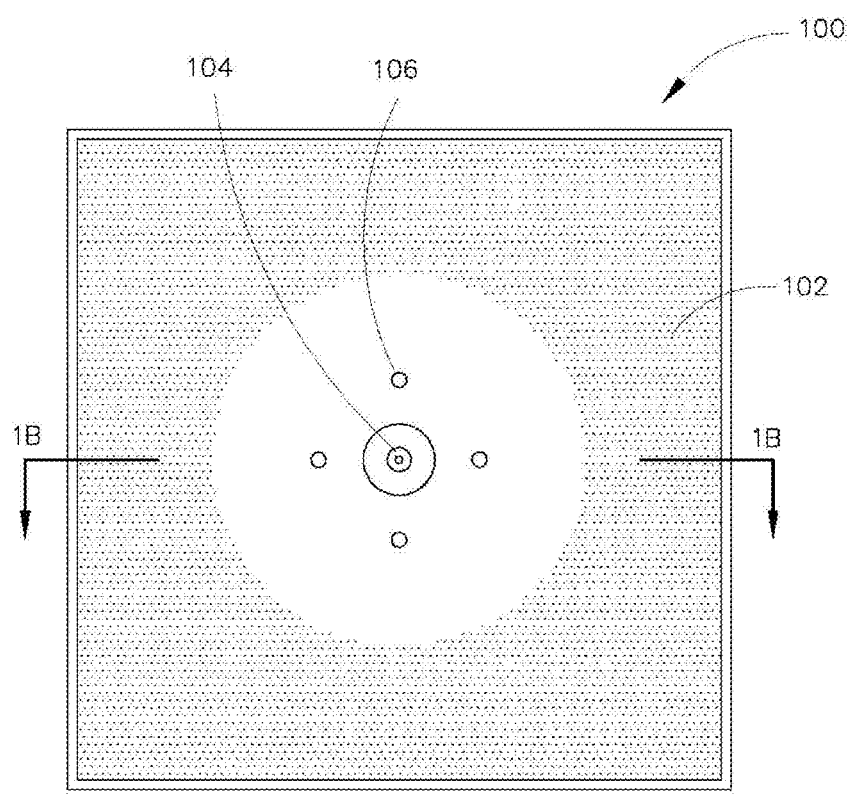
FIG. 1A shows a top, schematic view of a top mounted column placement element for a round column according to one embodiment of the present invention.
Figure 1B:
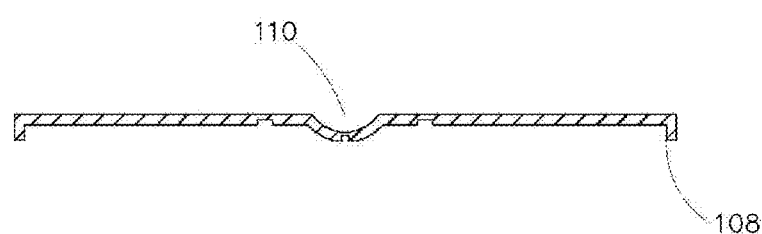
FIG. 1B shows a side, schematic view of a top mounted column placement element for a round column according to one embodiment of the present invention.

Referring to FIGS. 1A and 1B, top and side, schematic views of a top mounted column placement element for a round column according to one embodiment of the present invention is shown. In at least one embodiment, the top mounted column placement element 100 includes a plumb bob placement indicator 104. The plumb bob placement indicator 104 indicates the proper location for a hook screw to hang a plum bob. The top mounted column placement element 100 may be mounted to a ceiling or some other structure corresponding to the top portion of a decorative, architectural or building column by one or more screws through one or more screw holes 106. Alternatively, the top mounted column placement element 100 may be affixed to a ceiling by a chemical adhesive. In addition, a gasket may be placed between the ceiling and the top mounted column placement element 100.

In at least one embodiment, the plumb bob placement indicator 104 may correspond to a protrusion 110 configured to place a gap between the ceiling mounting surface and the plumb bob placement indicator 104. The protrusion 110 facilitates placement of the hook screw.

In at least one embodiment, the top mounted column placement element 100 may include an outside perimeter flange 108 configured to surround the outside perimeter of a column top cap. The outside perimeter flange 108 may prevent water intrusion, vermin, refuse and other such undesirable material beneath the top cap once installed.

In at least one embodiment, the bottom surface of the top mounted column placement element 100 may include a visual column placement indicator 102. The visual column placement indicator 102 defines the outside perimeter of the column once the column is in position. In at least one embodiment, the visual column placement indicator 102 may comprise a differing finish as compared to the rest of the top mounted column placement element 100.

In at least one embodiment, the plumb bob placement indicator 104 is centered in the top mounted column placement element 100. Furthermore, the visual column placement indicator 102 may define a perimeter equidistant from the plumb bob placement indicator 104.

Figure 2A:
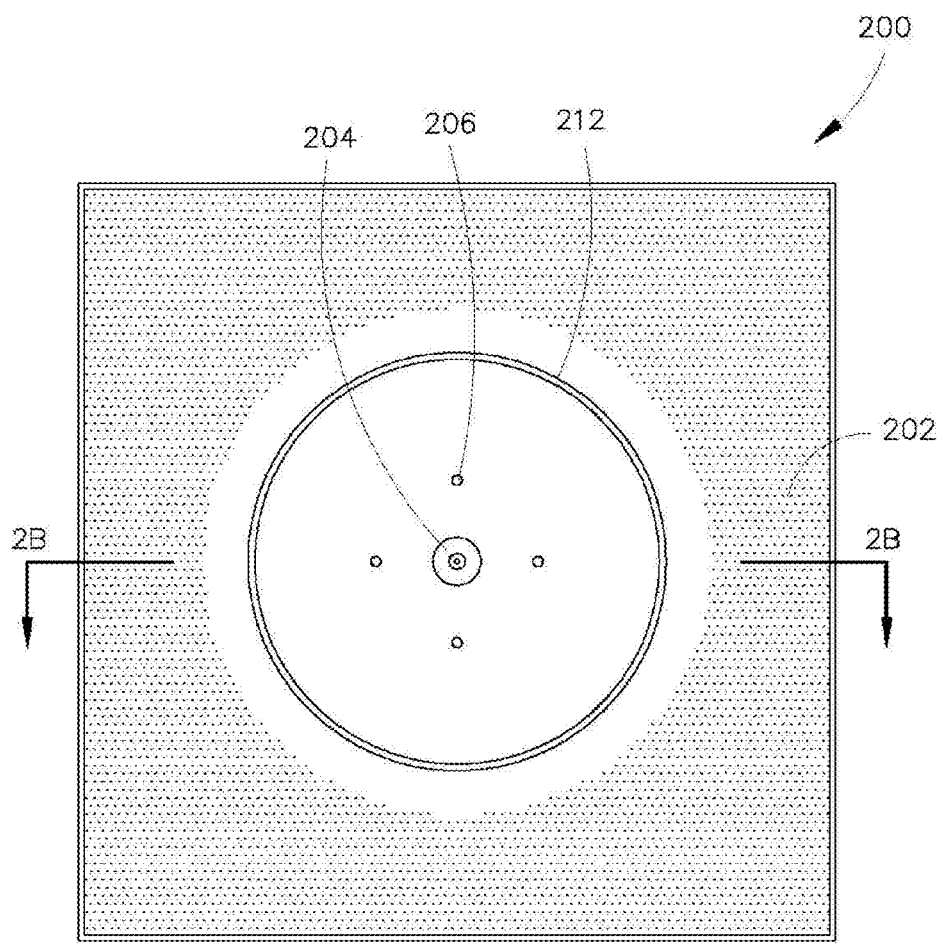
FIG. 2A shows a top, schematic view of a top mounted column placement element for a round column according to one embodiment of the present invention.
Figure 2B:
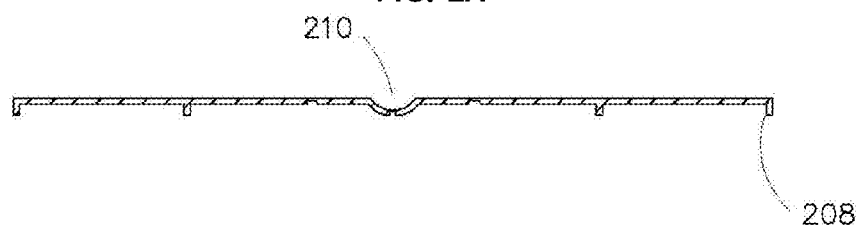
FIG. 2B shows a side, schematic view of a top mounted column placement element for a round column according to one embodiment of the present invention.

Referring to FIGS. 2A and 2B, top and side, schematic views of a top mounted column placement element for a round column according to one embodiment of the present invention is shown. In at least one embodiment, the top mounted column placement element 200 includes a plumb bob placement indicator 204. The plumb bob placement indicator 204 indicates the proper location for a hook screw to hang a plum bob. The top mounted column placement element 200 may be mounted to a ceiling or some other structure corresponding to the top portion of a column by one or more screws through one or more screw holes 206. Alternatively, the top mounted column placement element 200 may be affixed to a ceiling by a chemical adhesive. In addition, a gasket may be placed between the ceiling and the top mounted column placement element 200.

In at least one embodiment, the plumb bob placement indicator 204 may correspond to a protrusion 210 configured to place a gap between the ceiling mounting surface and the plumb bob placement indicator 204. The protrusion 210 facilitates placement of the hook screw.

In at least one embodiment, the top mounted column placement element 200 may include an outside perimeter flange 208 configured to surround the outside perimeter of a column top cap. The outside perimeter flange 208 may prevent water intrusion, vermin, refuse and other such undesirable material beneath the top cap once installed.

In at least one embodiment, the bottom surface of the top mounted column placement element 200 may include a visual column placement indicator 202. The visual column placement indicator 202 defines the outside perimeter of the column once the column is in position; during installation, the top of the column is placed such that the perimeter of the top of the column corresponds to the visual column placement indicator 202, thereby ensuring that the top of the column is properly positioned. In at least one embodiment, the visual column placement indicator 202 may comprise a differing finish as compared to the rest of the top mounted column placement element 200. Alternatively, or in addition to the visual column placement indicator 202, the top mounted column placement element 200 may include an internal column flange 212 to hold a column in place.

In at least one embodiment, the plumb bob placement indicator 204 is centered in the top mounted column placement element 200. Furthermore, the visual column placement indicator 202 may define a perimeter equidistant from the plumb bob placement indicator 204.

Figure 3:
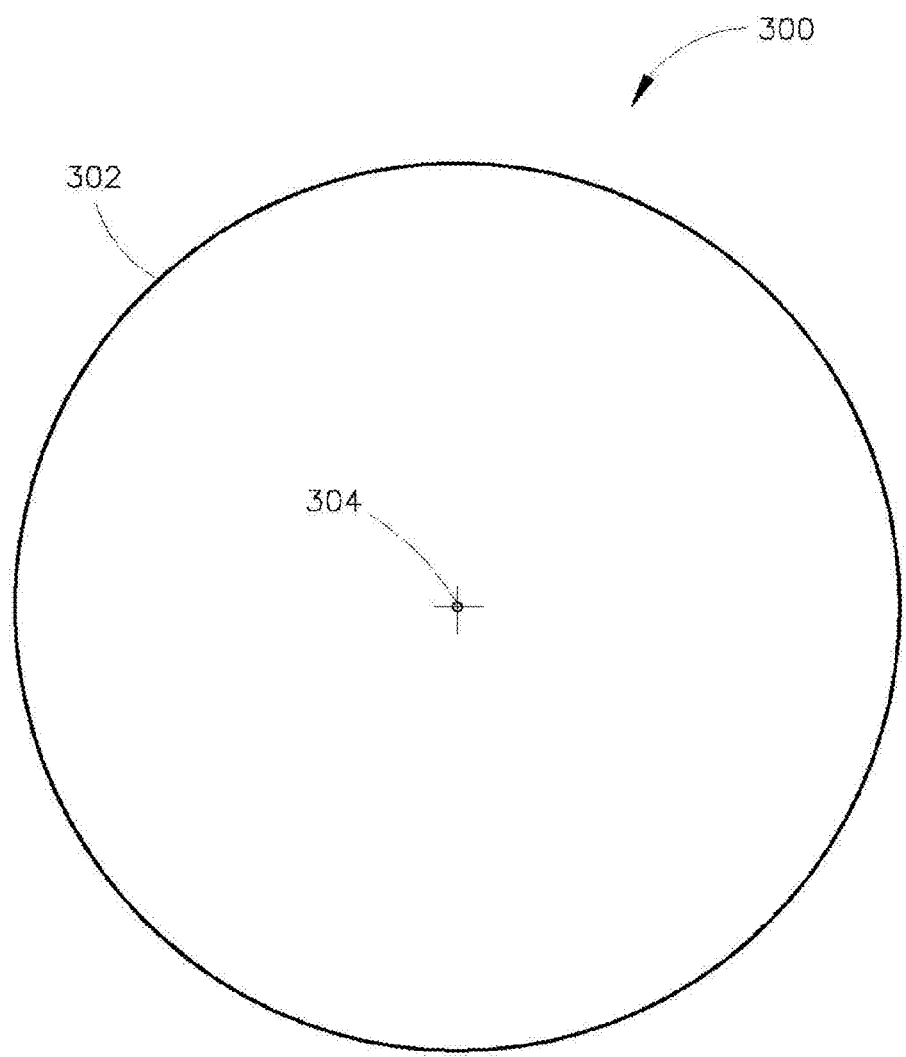
FIG. 3 shows a top view of a bottom mounted column placement element for a round column according to at least one embodiment of the present invention.

Referring to FIG. 3, a top view of a bottom mounted column placement element for a round column according to at least one embodiment of the present invention is shown. In at least one embodiment of the present invention, a bottom mounted column placement element 300 comprises a plumb bob target 304. In conjunction with a plumb bob hanging from a corresponding top mounted column placement element, the bottom mounted placement element 300 is placed such that the plumb bob target 304 is aligned with the hanging plumb bob. An outside perimeter placement indicator 302 indicates where the outside of a column should be placed so that the column is properly aligned at both the top and bottom. A base cap may then be placed to cover the bottom mounted placement element.

In at least one embodiment, the bottom mounted placement element 300 may be taped or chemically adhered to a bottom surface once properly placed with reference to the plumb bob target 304 so that the plumb bob may be removed.

Referring to FIGS. 4A and 4B, top and side, schematic views of a top mounted column placement element for a square column according to one embodiment of the present invention is shown. In at least one embodiment, the top mounted column placement element 400 includes a plumb bob placement indicator 404. The plumb bob placement indicator 404 indicates the proper location for a hook screw to hang a plum bob. The top mounted column placement element 400 may be mounted to a ceiling or some other structure corresponding to the top portion of a column by one or more screws through one or more screw holes 406. Alternatively, the top mounted column placement element 400 may be affixed to a ceiling by a chemical adhesive. In addition, a gasket may be placed between the ceiling and the top mounted column placement element 400.

In at least one embodiment, the top mounted column placement element 400 may include a second plumb bob placement indicator 412 for hanging a plumb bob to correctly orient a corresponding bottom mounted placement element. Because the top mounted column placement element 400 and corresponding column are not round, the correct orientation of the top mounted column placement element 400 and corresponding bottom mounted placement element are aesthetically necessary.

In at least one embodiment, the plumb bob placement indicator 404 may correspond to a protrusion 410 configured to place a gap between the ceiling mounting surface and the plumb bob placement indicator 404. The protrusion 410 facilitates placement of the hook screw.

In at least one embodiment, the top mounted column placement element 400 may include an outside perimeter flange 408 configured to surround the outside perimeter of a column top cap. The outside perimeter flange 408 may prevent water intrusion, vermin, refuse and other such undesirable material beneath the top cap once installed.

In at least one embodiment, the bottom surface of the top mounted column placement element 400 may include a visual column placement indicator 402. The visual column placement indicator 402 defines the outside perimeter of the column once the column is in position. In at least one embodiment, the visual column placement indicator 402 may comprise a differing finish as compared to the rest of the top mounted column placement element 400.

In at least one embodiment, the plumb bob placement indicator 404 is centered in the top mounted column placement element 400. Furthermore, the visual column placement indicator 402 may define a perimeter equidistant from the plumb bob placement indicator 404.

Figure 5A:
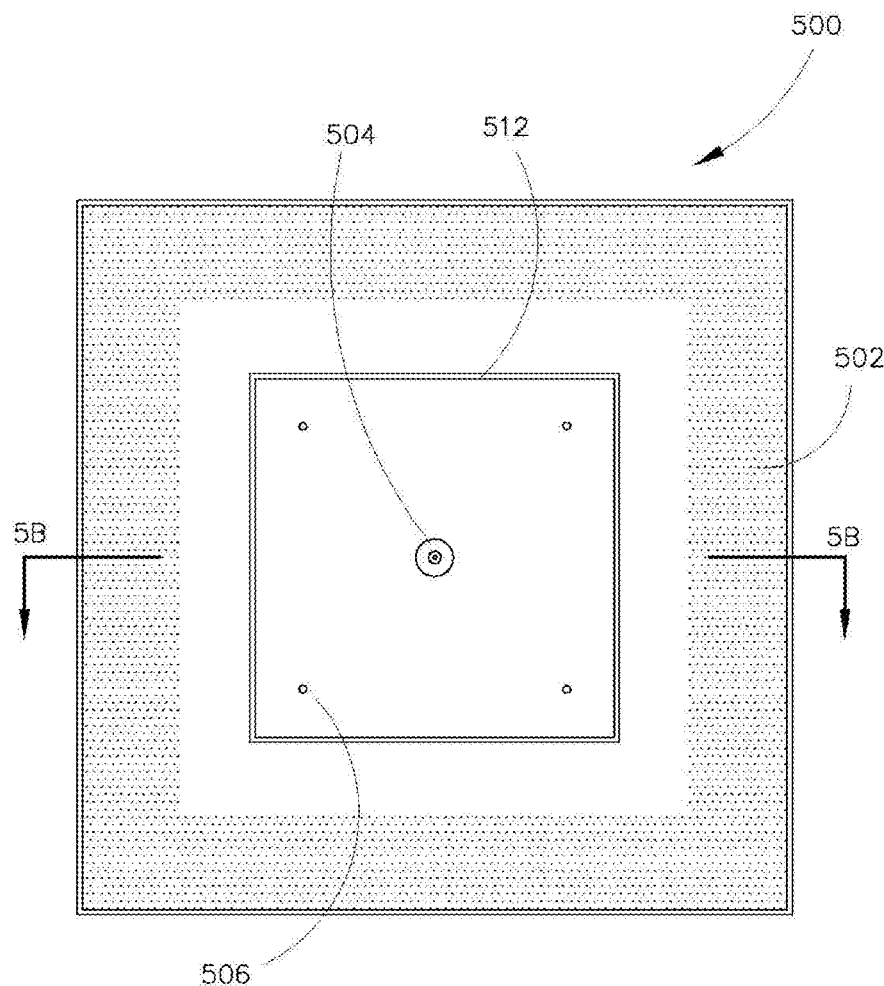
FIG. 5A shows a top, schematic view of a top mounted column placement element for a square column according to one embodiment of the present invention.
Figure 5B:
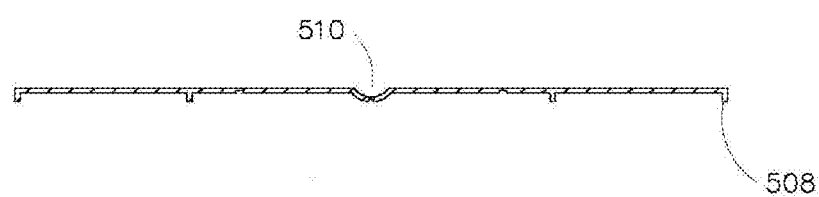
FIG. 5B shows a side, schematic view of a top mounted column placement element for a square column according to one embodiment of the present invention.

Referring to FIGS. 5A 5B, top and side, schematic views of a top mounted column placement element for a square column according to one embodiment of the present invention is shown. In at least one embodiment, the top mounted column placement element 500 includes a plumb bob placement indicator 504. The plumb bob placement indicator 504 indicates the proper location for a hook screw to hang a plumb bob. The top mounted column placement element 500 may be mounted to a ceiling or some other structure corresponding to the top portion of a column by one or more screws through one or more screw holes 506. Alternatively, the top mounted column placement element 500 may be affixed to a ceiling by a chemical adhesive. In addition, a gasket may be placed between the ceiling and the top mounted column placement element 500.

In at least one embodiment, the top mounted column placement element 500 may include a second plumb bob placement indicator (not shown) for hanging a plumb bob to correctly orient a corresponding bottom mounted placement element. Because the top mounted column placement element 500 and corresponding column are not round, the correct orientation of the top mounted column placement element 500 and corresponding bottom mounted placement element are aesthetically necessary.

In at least one embodiment, the plumb bob placement indicator 504 may correspond to a protrusion 510 configured to place a gap between the ceiling mounting surface and the plumb bob placement indicator 504. The protrusion 510 facilitates placement of the hook screw.

In at least one embodiment, the top mounted column placement element 500 may include an outside perimeter flange 508 configured to surround the outside perimeter of a column top cap. The outside perimeter flange 508 may prevent water intrusion, vermin, refuse and other such undesirable material beneath the top cap once installed.

In at least one embodiment, the bottom surface of the top mounted column placement element 500 may include a visual column placement indicator 502. The visual column placement indicator 502 defines the outside perimeter of the column once the column is in position. In at least one embodiment, the visual column placement indicator 502 may comprise a differing finish as compared to the rest of the top mounted column placement element 500. Alternatively, or in addition to the visual column placement indicator 502, the top mounted column placement element 500 may include an internal column flange 512 to hold a column in place.

In at least one embodiment, the plumb bob placement indicator 504 is centered in the top mounted column placement element 500. Furthermore, the visual column placement indicator 502 may define a perimeter equidistant from the plumb bob placement indicator 504.

Figure 6:
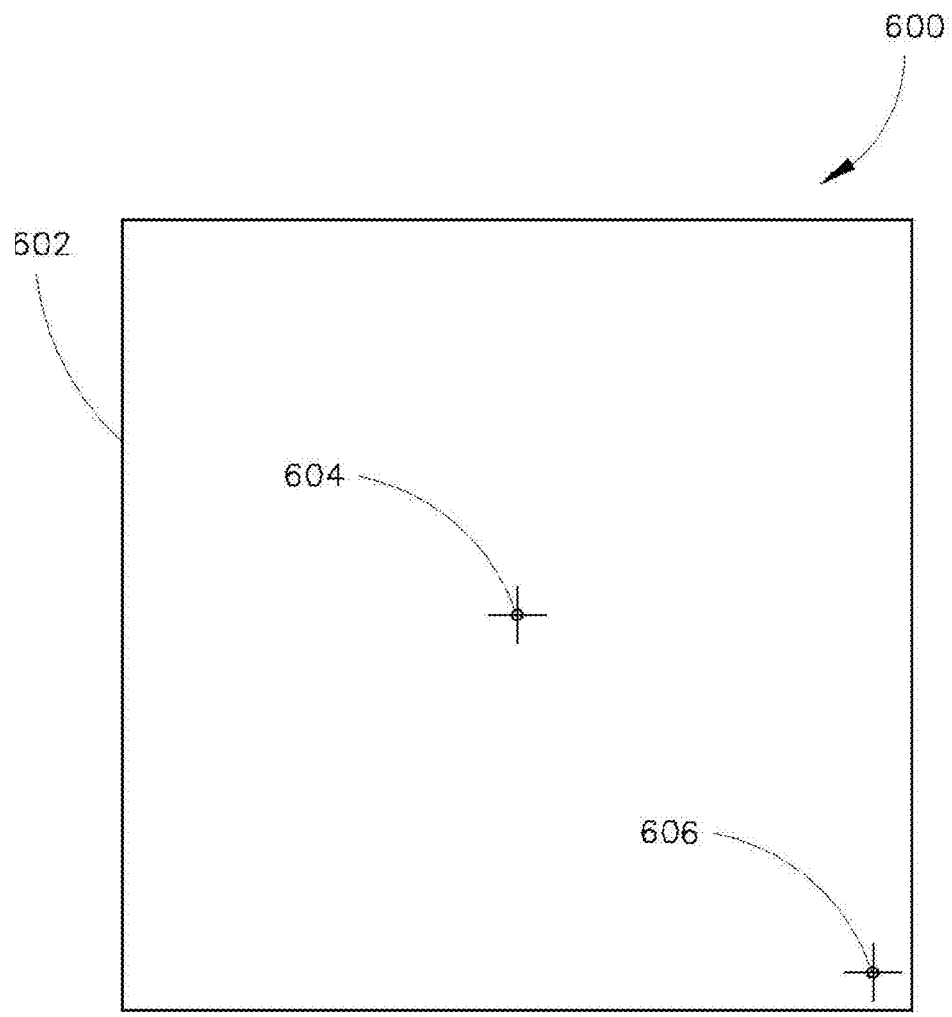
FIG. 6 shows a top view of a bottom mounted column placement element for a square column according to at least one embodiment of the present invention.

Referring to FIG. 6, a top view of a bottom mounted column placement element for a square column according to at least one embodiment of the present invention is shown. In at least one embodiment of the present invention, a bottom mounted column placement element 600 comprises a plumb bob target 604. In conjunction with a plumb bob hanging from a corresponding top mounted column placement element, the bottom mounted placement element 600 is placed such that the plumb bob target 604 is aligned with the hanging plumb bob. An outside perimeter placement indicator 602 indicates where the outside of a column should be placed so that the column is properly aligned at both the top and bottom. A base cap may then be placed to cover the bottom mounted placement element.

In at least one embodiment, the bottom mounted column placement element 600 may include a second plumb bob target 606 for indicating the proper orientation of the bottom mounted placement element 600 with reference to a corresponding top mounted column placement element. Because the top mounted column placement element, bottom mounted placement element 600 and corresponding column are not round, the correct orientation of the bottom mounted placement element 600 and corresponding top mounted column placement element are aesthetically necessary.

In at least one embodiment, the bottom mounted placement element 600 may be taped or chemically adhered to a bottom surface once properly placed with reference to the plumb bob target 604 so that the plumb bob may be removed.

Figure 7:
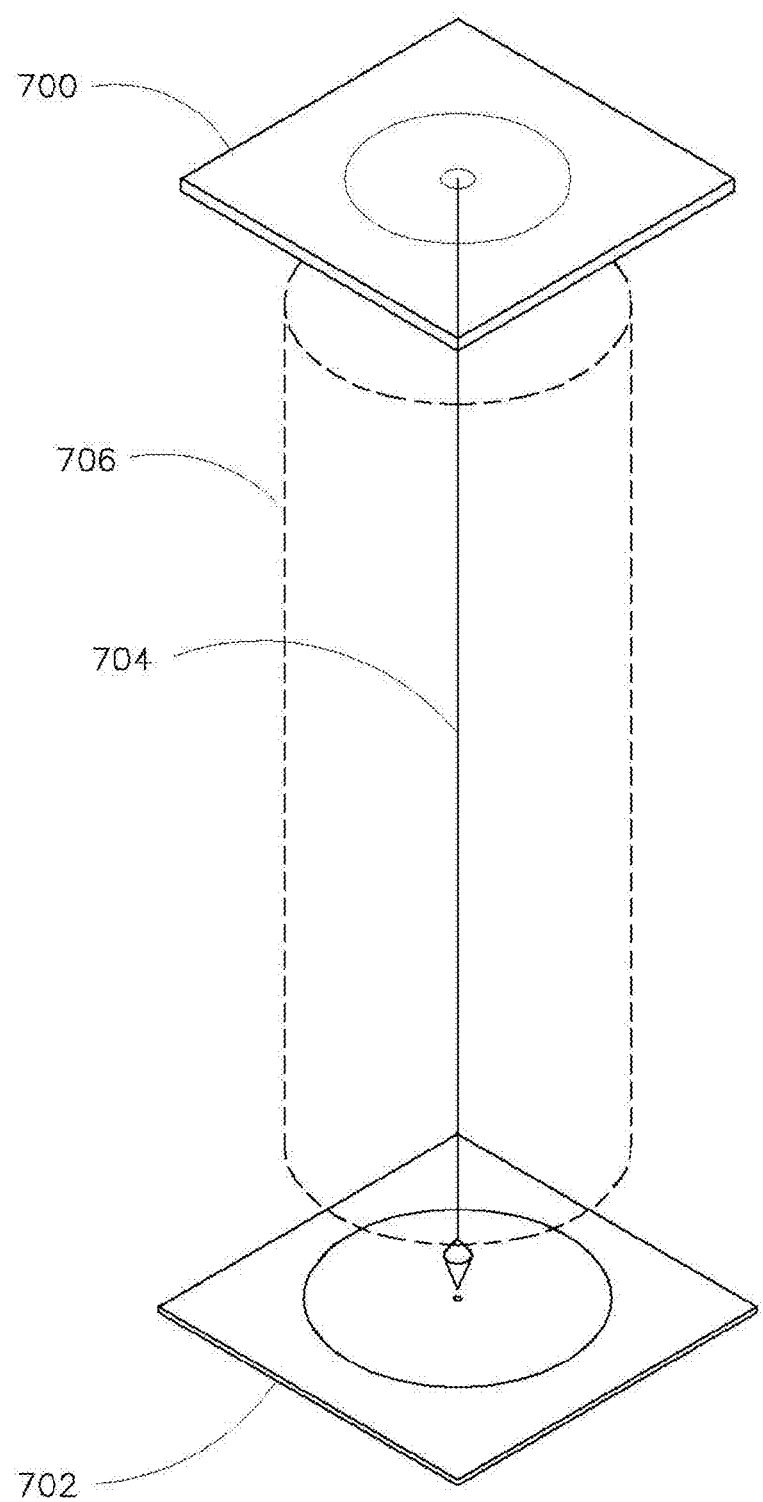
FIG. 7 shows a perspective, environmental view of one embodiment of the present invention.

Referring to FIG. 7, a perspective, environmental view of one embodiment of the present invention is shown. In at least one embodiment, a top mounted column placement element 700 is mounted to a top surface corresponding to the location of the top of a column 706. A plumb bob 704 is attached at a plumb bob placement indicator in the top mounted column placement element 700 indicates the center, plumb bob target of a bottom mounted column placement element 702. The plumb bob 704 allows the top mounted column placement element 700 and bottom mounted column placement element 702 to be aligned such that a column 706 placed with reference to a visual column placement indicator in the top mounted column placement element 700 and outside perimeter placement indicator in the bottom mounted column placement element 702 will be substantially vertical.

Figure 8:
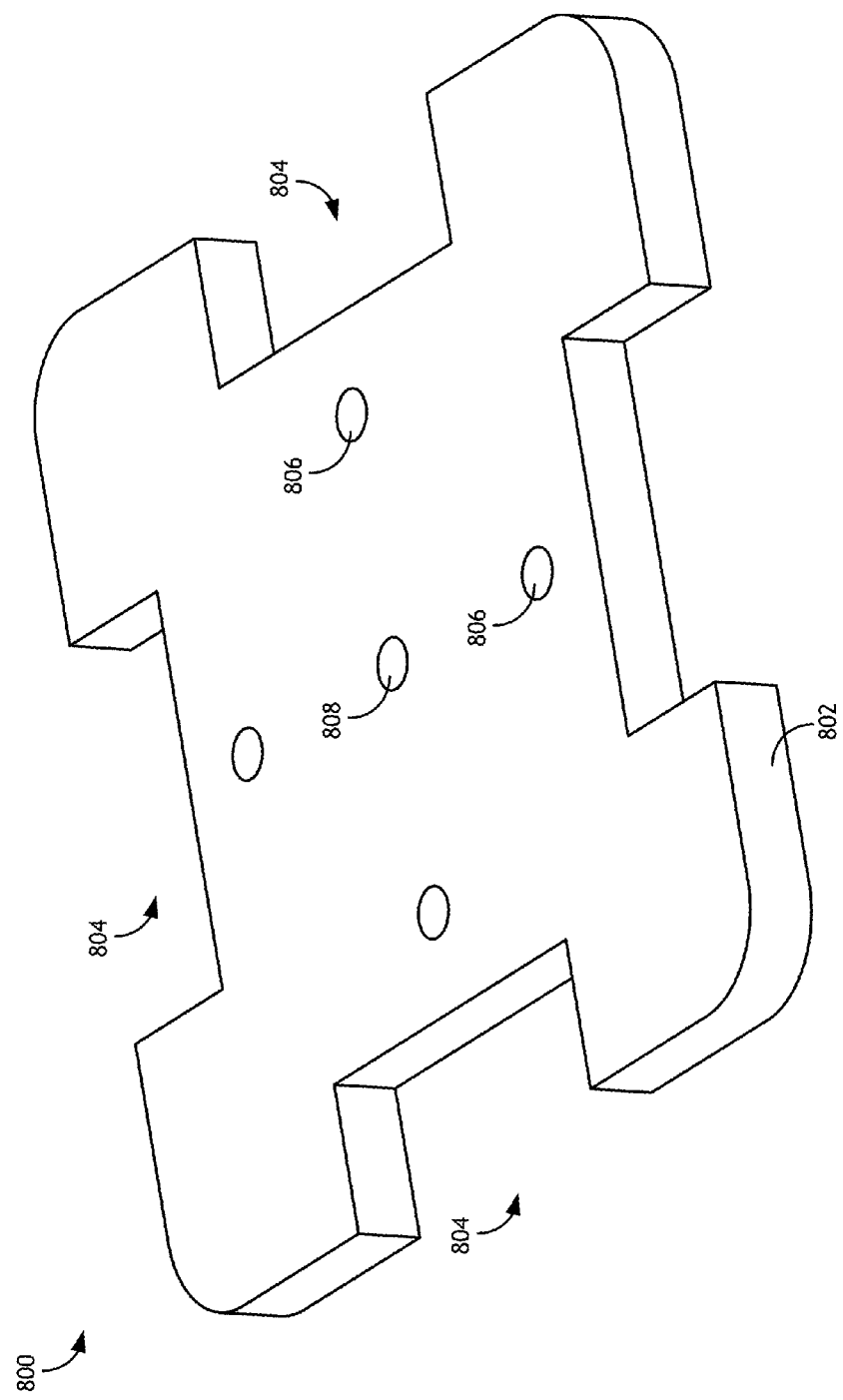
FIG. 8 shows a perspective view of a top mounted column placement element for a square column according to one embodiment of the present invention.

Referring to FIG. 8, a perspective view of a top mounted column placement element 800 for a square column according to one embodiment of the present invention is shown. In at least one embodiment, the top mounted column placement element 800 defines a perimeter surface 802. The perimeter surface 802 abuts an internal surface of a corresponding column. The corresponding column is thereby constrained to a specific location without any portion of the top mounted column placement element 800 protruding outside the corresponding column.

In at least one embodiment, the top mounted column placement element 800 defines one or more support recesses 804 that each correspond to a stiffening element affixed to or comprising an internal surface of the corresponding column. Columns useful with embodiments of the present invention may comprise polyvinyl carbonate (PVC). Tall, rectangular PVC columns may require stiffening elements in the internal surfaces of each wall so that the one or more support recesses 804 are needed to accommodate the stiffening elements. Furthermore, the one or more support recesses 804 may engage the stiffening elements to further constrain the movement of the corresponding column. Specifically, the engagement of the one or more support recesses 804 and stiffening elements may prevent rotational movement of the column. For example, while the top mounted column placement element 800 in FIG. 8 is rectangular, a rectangular PVC column may distort with sufficient angular force. Furthermore, embodiments of the present invention may comprise a round top mounted column placement element 800. In such embodiment, a support recess 804 may be necessary to prevent undesirable rotation of the column.

The top mounted column placement element 800 defines a plurality of screw or bolt holes 806 for affixing the top mounted column placement element 800 to a ceiling were the column will be placed. In some embodiments, the screw or bolt holes 806 may be spaced to correspond to standard spacing of structural elements where the top mounted column placement element 800 will be affixed.

In some embodiments, the top mounted column placement element 800 may further define a plumb bob placement element 808 such as a plumb bob screw hole. The plum bob placement element 808 is located at the center of the top mounted column placement element 800.

In some embodiments, additional plumb bob placement elements 808 may be located off-center so as to orient a bottom mounted column placement element.

Figure 9:
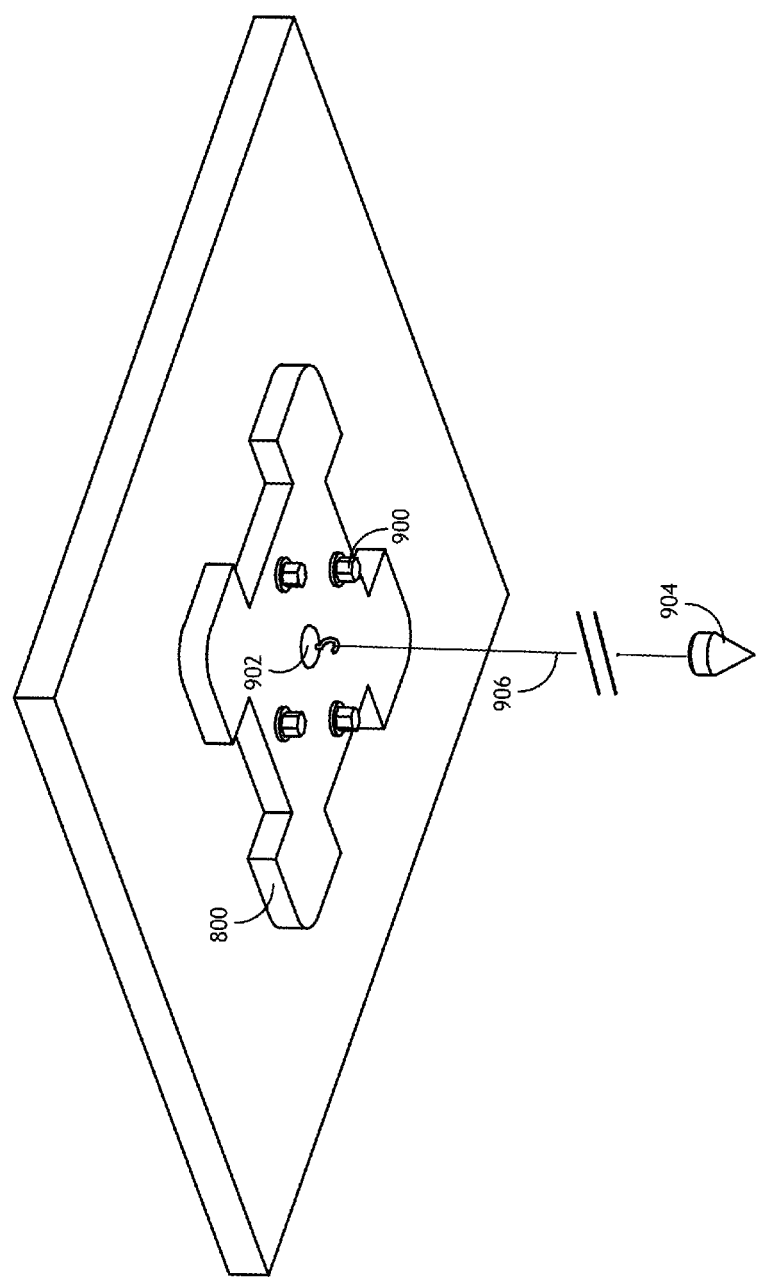
FIG. 9 shows a perspective, environmental view of the top mounted column placement element of FIG. 8.

Referring to FIG. 9, a perspective, environmental view of the top mounted column placement element 800 of FIG. 8 is shown. In at least one embodiment, the top mounted column placement element 800 is affixed a ceiling surface via a plurality of screws or bolts 900. A plumb bob hanging element 902 is inserted or otherwise engaged with a plum bob placement element defined by the top mounted column placement element 800. A plumb bob 904 hung by a string 906 from the plumb bob hanging element 902 will locate a center point for the bottom of a column installed around the top mounted column placement element 800. A corresponding bottom mounted column placement element may be placed to conform with the located center point.

In at least one embodiment, the plumb bob hanging element 902 may be molded into the top mounted column placement element 800 such that the plum bob placement element 808 corresponds to the plumb bob hanging element 902.

Figure 10B:
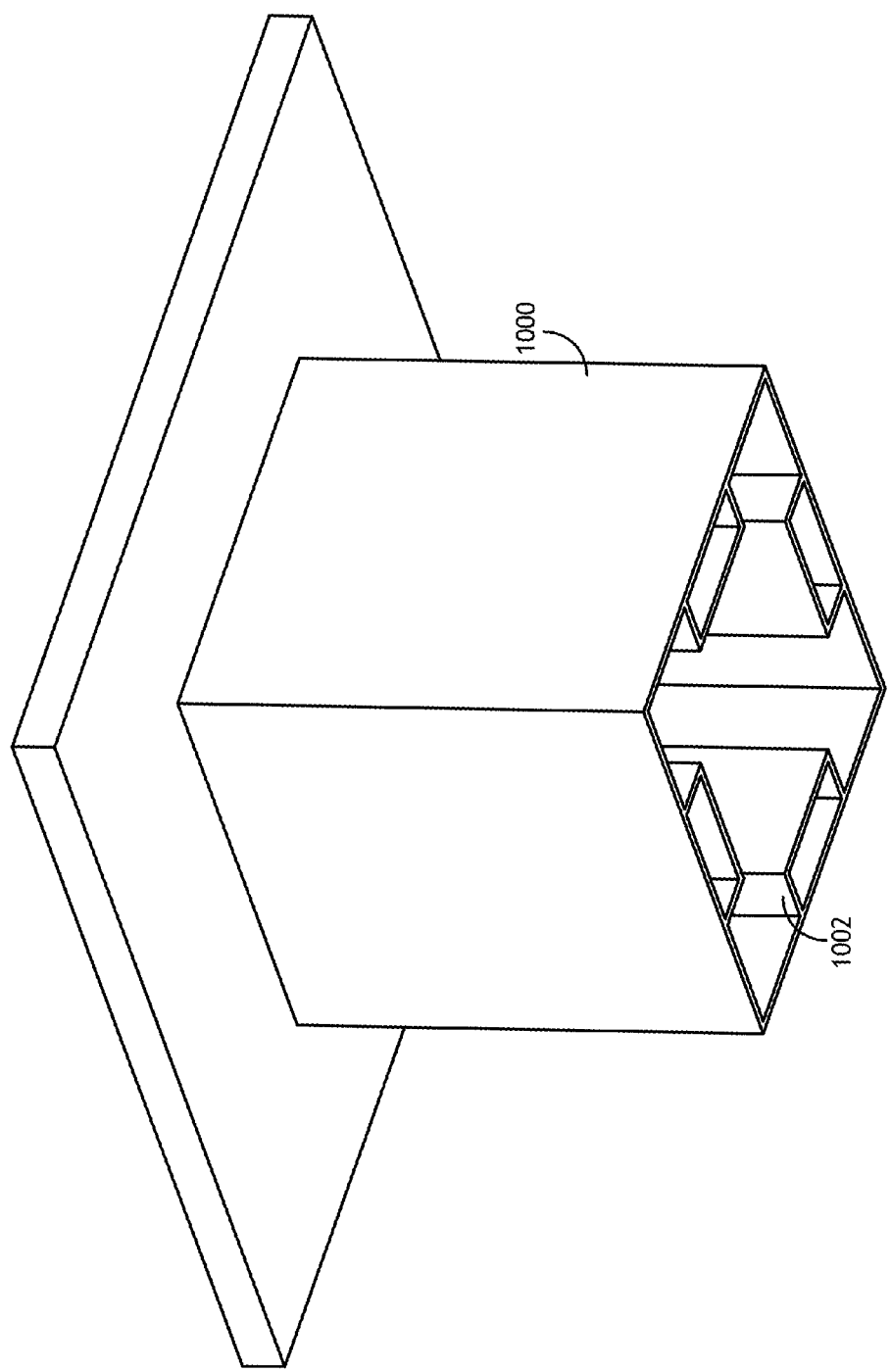
FIG. 10B shows a perspective, environmental view of the top mounted column placement element of FIG. 8 with a corresponding column.

Referring to FIGS. 10A and 10B, perspective, environmental and partial cross-sectional views of the top mounted column placement element 800 of FIG. 8 with a corresponding column 1000 are shown. The top mounted column placement element 800, affixed to a surface via a plurality of screws or bolts 900, locates and secures the top portion of a column 1000 by engaging an internal surface of the column 1000 with a perimeter surface 802 defined by the top mounted column placement element 800. In at least one embodiment, the column 1000 may be affixed to the top mounted column placement element 800 by screwing through the walls of the column 1000 into the body of the top mounted column placement element 800.

In at least one embodiment, where the column 1000 includes one or more stiffening elements 1002, the top mounted column placement element 800 defines one or more support recesses 804 configured to engage the one or more stiffening elements 1002 and allow the column 1000 to completely surround the top mounted column placement element 800. Furthermore, the engagement of the stiffening elements 1002 and corresponding support recesses 804 constrain and secure the column 1000 in place, and against rotational forces.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. Features of various described embodiments may be combined to arrive at embodiments not specifically described. The form herein before described being merely an explanatory embodiment thereof, it is the intention of the following claims to encompass and include such changes.

What is claimed is:

1. A column plumbing kit comprising: a top mounted column placement element comprising: an element body defining: a perimeter surface configured to engage an internal surface of a column; one or more support recesses, each configured to engage a stiffening element disposed on the internal surface of the column; and a plurality of screw holes; and a plumb bob location indicator; and a bottom mounted placement indicator comprising: a plumb bob target; and a column bottom perimeter indicator.

2. The column plumbing kit of claim 1, wherein the plumb bob location indicator comprises a protrusion configured to place a gap between the plumb bob location indicator and a mounting surface.

3. The column plumbing kit of claim 1, further comprising a plumb bob.

4. The column plumbing kit of claim 1, wherein the one or more support recesses are further configured to prevent rotation of the column when installed.

5. The column plumbing kit of claim 1, wherein: the top mounted column placement element further comprises a plumb bob orientation indicator; and the bottom column placement indicator further comprises a plumb bob orientation target configured to orient the column bottom perimeter indicator.

6. The column plumbing kit of claim 5, further comprising a plumb bob.

7. A top mounted column placement apparatus comprising: an element body defining: a perimeter surface configured to engage an internal surface of a column; one or more support recesses, each configured to engage a stiffening element disposed on the internal surface of the column; and a plurality of screw holes; and a plumb bob location indicator.

8. The top mounted column placement apparatus of claim 7, wherein the plumb bob location indicator comprises a plumb bob string hook.

9. The top mounted column placement apparatus of claim 7, wherein the support recesses are further configured to prevent rotation of the column when installed.

10. The top mounted column placement apparatus of claim 7, further comprising a plumb bob orientation indicator.

11. A method for plumbing a column comprising: mounting a top mounted column placement element to a top placement surface, the top mounted column placement element defining a perimeter surface configured to engage an internal surface of a column; hanging a plumb bob from a plumb bob placement indicator on the top mounted placement element; align a bottom mounted placement indicator to the plumb bob with reference to a plumb bob target on the bottom mounted placement indicator; engage an internal surface of a top portion of a column to the perimeter surface of the top mounted column placement element, wherein the internal surface comprises one or more stiffening elements, each disposed to engage a recess in the perimeter surface of the top mounted column placement element; and mounting the bottom mounted placement indicator to a bottom placement surface.

12. The method of claim 11, further comprising aligning a bottom portion of the column to a column bottom perimeter indicator on the bottom mounted placement indicator.

13. The method of claim 11, further comprising:
    hanging an orienting plumb bob from a plumb bob orientation indicator on the top mounted column placement element; and orienting the bottom mounted placement indicator to the orienting plumb bob with reference to a plumb bob orientation target on the bottom mounted placement indicator.

14. The method of claim 13, further comprising aligning a bottom portion of the column to a column bottom perimeter indicator on the bottom mounted placement indicator.

* * * * *